United States Patent

Kroenke et al.

[11] Patent Number: 5,231,127
[45] Date of Patent: Jul. 27, 1993

[54] METAL TITANATES AS PARTIAL REPLACEMENTS FOR TITANIUM DIOXIDE IN PIGMENTED POLYVINYL CHLORIDE-TYPE COMPOSITIONS

[75] Inventors: William J. Kroenke, Brecksville; Ervin J. Williger, Tallmadge, both of Ohio

[73] Assignee: The B. F. Goodrich Company, Akron, Ohio

[21] Appl. No.: 935,674

[22] Filed: Aug. 25, 1992

Related U.S. Application Data

[63] Continuation of Ser. No. 492,703, Mar. 13, 1990, abandoned.

[51] Int. Cl.5 .............................................. C08K 3/10
[52] U.S. Cl. .................... 524/403; 524/436; 524/437
[58] Field of Search .................. 524/403, 436, 437

[56] References Cited

U.S. PATENT DOCUMENTS

| | | |
|---|---|---|
| 3,509,082 | 4/1970 | Mays . |
| 3,677,980 | 7/1972 | Last . |
| 3,827,901 | 8/1974 | Griffin et al. . |
| 3,907,656 | 9/1975 | de Souza . |
| 3,998,973 | 12/1976 | Carlson . |
| 4,078,941 | 3/1978 | Bundy et al. . |
| 4,116,907 | 9/1978 | Shiohara ............... 524/436 |
| 4,396,730 | 8/1983 | Imahashi ............... 524/436 |
| 4,496,620 | 1/1985 | Park et al. . |
| 4,525,518 | 6/1985 | Kostansek . |
| 4,584,330 | 4/1986 | Wason . |
| 4,677,022 | 6/1987 | Dejaiffe . |
| 4,689,211 | 8/1987 | Nishiuchi et al. . |
| 4,812,299 | 3/1989 | Huber . |

Primary Examiner—Joseph L. Schofer
Assistant Examiner—Peter D. Mulcahy
Attorney, Agent, or Firm—Hudak & Shunk Co.

[57] ABSTRACT

A pigmented vinyl chloride composition is provided which has a whitening and opacifying package comprising titanium dioxide and a titanium dioxide replacement/extender. The replacement/extender replaces up to 30 percent by weight of the titanium dioxide and yet maintains one or more selected optical property as if the whitening and opacifying package were pure titanium dioxide. These optical properties include the Yellowness Index, the DE* value and the percentage light transmittance. The extender is one or more of an alkaline earth metal titanate, lanthanide titanate, or aluminum titanate.

12 Claims, No Drawings

METAL TITANATES AS PARTIAL REPLACEMENTS FOR TITANIUM DIOXIDE IN PIGMENTED POLYVINYL CHLORIDE-TYPE COMPOSITIONS

This application is a continuation of application Ser. No. 07/492,703, filed on Mar. 13, 1990 now abandoned, by Droenke et al., for METAL TITANATES AS PARTIAL REPLACEMENT FOR TITANIUM DIOXIDE IN PIGMENTED POLYVINYL CHLORIDE-TYPE COMPOSITIONS.

FIELD OF THE INVENTION

The invention relates to pigmented polyvinyl chloride compositions, and more specifically to whitening and opacifying packages for polyvinyl chloride compositions having a reduced content of titanium dioxide.

BACKGROUND OF THE INVENTION

It has been customary in the past to make whitened or otherwise pigmented polyvinyl chloride polymers or compositions using titanium dioxide as a whitener. The appearance of such polymers or compositions is measured relative to the overall appearance or look of the material, the yellowness, and the opacity of the material.

In the past, the main additive used in PVC known to produce useful hiding power (i.e., opacity and whitening) has been titanium dioxide. This has effectively presented a monopoly for the producers and distributors of this composition. Since the supply of titanium dioxide is, at times, less than the demand, it is an advantage to find a substitute for titanium dioxide as a whitener and/or opacifying agent. Attempts have been made in the past to find such substitutes. For example, carbon black has been used for its opacifying characteristics. However, carbon black presents the disadvantage that it discolors, i.e., darkens, the compositions in which it is used and makes it difficult to achieve a white or lightly-tinted composition. In the paint and paper industry in particular, hollow plastic microspheres have been used, but these whiteners and/or opacifying agents do not stand up to processing conditions which are used for polyvinyl chloride-type compositions.

U.S. Pat. No. 3,827,901 (Griffin et al, Aug. 6, 1974) relates to a composition of matter which is useful as a pigment composition for the paper industry. The composition is water-insoluble and comprises an intimate mixture of titanium dioxide and a calcium-aluminum-silicate composition in which the amount of titanium dioxide employed is from 0.6 to 4 parts for each part of the calcium-aluminum-silicate composition.

U.S. Pat. No. 4,078,941 (Bundy et al, Mar. 14, 1978) relates to a high bulking clay consisting essentially of selected flocculated ultrafine particles of clay coated with a member from the group consisting of polyfunctional amines and long chain amines.

U.S. Pat. No. 4,525,518 (Kostansek, Jun. 25, 1985) relates to pigments useful as primary extenders in exterior grade latex formulations. The pigments are composed of particles of calcined clay, substantially all the particles of which are finer than about 44 microns, and having an average particle size, equivalent spherical diameter, within the range of about 3 to 10 microns, most preferably within the range of about 4 to 8 microns.

U.S. Pat. No. 4,677,022 (Dejaiffe, Jun. 30, 1987) relates to a method of producing lightweight bodies having a glossy exterior which are suitable for use as modifiers, enhancers, fillers, extenders, and opacifiers in polymeric formulations. The reference also relates to the lightweight bodies themselves and to plastic composites in which those lightweight bodies are incorporated.

SUMMARY OF THE INVENTION

The invention relates to polyvinyl chloride and polyvinyl chloride-type compositions using a whitening and opacifying package at levels of from about 0 to about 30 parts of this package per hundred parts resin (phr). This whitening and opacifying package comprises titanium dioxide and from more than 0 to about 30 percent by weight of a metal titanate. In the whitening and opacifying package, the metal titanate is an extender for the titanium dioxide insofar as it acts as a replacement for the same amount by weight of titanium dioxide. The whitening and opacifying package generally achieves one or more optical property which is substantially comparable or superior to that achieved by pure titanium dioxide. These properties are Yellowness Index ("Y.I.") value, an overall appearance value DE* (further defined in Example 1), and a percentage light-transmitted value (also further defined as in Example 1). By "substantially comparable" it is meant that one or more of DE*, the Yellowness Index, and the percent light transmission values of a pigmented polymer composition using the whitening and opacifying package are substantially the same as, or better than, the same pigmented polymer composition containing a weight of titanium dioxide equivalent to the weight of the whitening and opacifying package.

It is an advantage of the present invention to provide a whitening and opacifying package having a reduced content of titanium dioxide while maintaining a suitable degree of whiteness and opacity or even improving these characteristics.

It is a further advantage of the invention to provide colored polyvinyl chloride compositions with useful opacifying characteristics. These compositions are suitable for use where whitened and colored polyvinyl chloride and other vinyl-type compositions are currently utilized, for example, in domestic applications such as louver curtains, interior and exterior extruded profiles for windows, house siding, and conduit, and other molded product applications.

DETAILED DESCRIPTION OF THE INVENTION

The invention relates to a polyvinyl chloride composition having a titanium dioxide whitening and opacifying package with a reduced titanium dioxide content.

The whitening and opacifying package comprises at least about 70 percent of titanium dioxide, and preferably at least about 80 percent of titanium dioxide. This package further contains from more than 0 to about 30 percent of metal titanate, and preferably from more than 0 to about 20 percent metal titanate. The metal titanate acts as a partial replacement for titanium dioxide so that the amount of titanium dioxide can be reduced from the amount used in the prior art by up to about 30 percent by weight. This use is termed "extender" herein. The invention presents surprising results in that it allows the traditional whitener/opacifier, titanium dioxide, to be added in a diluted form which unexpectedly provides improved optical properties. While the amount of titanium dioxide can be reduced, the Yellowness Index, the DE* color-hue parameter, and/or the opacity of the polyvinyl chloride compositions may be improved or maintained as if the full amount of titanium dioxide were used. For example, as presented herein, the control polyvinyl chloride composition had a DE* value of 2.54, a Y.I. value of 5.99, and a percent light transmission value of 0.740. After replacing part of the titanium dioxide of this control with the metal titanate extenders, these performance values generally either remained essentially unchanged or were lowered (improved performance). Different base polyvinyl chloride compositions have different sets of the DE*, Y.I., and light transmission values which will be effected consistently by a substitution of the metal titanate extender of this invention for part of the titanium dioxide pigment in the base compositions. It is further recognized that by using the opacifying and whitening package of this invention, it is possible to make polyvinyl chloride compositions with improved optical properties compared to using only titanium dioxide as the opacifying and whitening agent.

The metal titanates of the present invention act as opacifiers which mean that they act to lower the percent light transmission when added to a composition. Further, some of these metal titanates act as whiteners which means that they lower the Yellowness Index and DE* values.

Titanium dioxide is used at a level of up to about 30 phr by weight of the polyvinyl chloride type composition, preferably at a level of 2 to 15 phr, and most preferably at a 4 to 10 phr by weight. The metal titanate is used at a level of more than 0 up to about 7 phr by weight of the polyvinyl chloride composition, preferably at up to about 5 phr, and most preferably up to about 3 phr.

Suitable metal titanates include all white, off-white, or lightly colored pre-transition and transition metal titanates and aluminum titanate. Examples of suitable metal titanates include the alkaline earth metal titanates, i.e., magnesium, calcium, and barium titanates; rare earth metal (lanthanide) titanates, especially lanthanum titanate and neodymium titanate; and aluminum titanate.

The preferred titanates are alkaline earth titanates, i.e., magnesium, barium, and calcium titanates. It is most preferred to use barium titanate. Where the extender is an alkaline earth titanate, each works as an opacifying agent and further is effective as a whitening extender when the alkaline earth metal oxide ["M(II)O"] is at a molar ratio to titanium dioxide ("TiO$_2$") of less than 1.0, and preferably less than 0.99, and has a solubility in 2.8 normal acetic acid less than 1.0 percent and preferably less than 0.82 percent.

The lanthanide rare earth titanates specifically include RE$_2$Ti$_2$O$_7$ or a mixture of RE$_2$Ti$_2$O$_7$ and RE$_4$Ti$_9$O$_{24}$ whereby RE$_4$Ti$_9$O$_{24}$ is present as a minor component, i.e., less than 20 percent by weight and preferably less than 10 percent by weight, and where RE represents a trivalent lanthanide element, especially lanthanum and neodymium or a mixture of rare earth elements. Rare earth titanates are effective as a whitener, and as an opacifying agent in the pigment package of the present invention.

Specific aluminum titanates include Al$_2$TiO$_5$ or aluminotitanate compositions containing Al$_2$TiO$_5$ as a major component, i.e., 25 percent or greater by weight, and preferably 50 percent or greater by weight. The aluminum titanates act as whitening and opacifying extenders when used in conjunction with titanium dioxide in the whitening/opacifying package of the present invention.

Particle size of the metal titanate extenders is an important consideration with respect to the ability to disperse the extenders in a polyvinyl chloride matrix and manufacture extruded and molded parts with smooth surfaces. For barium titanate, as well as the other metal titanate extenders, a desirable particle size is up to about 20 microns, preferably up to about 5 microns, and more preferably up to about 2 microns.

The whitening and opacifying package of the present invention can be used in "whitened polyvinyl chloride compounds." As used herein, "whitened polyvinyl chloride compounds" means either white compounds or, alternatively, colored compounds which utilize titanium dioxide to achieve a desired level of pigmentation and/or opacity.

The polyvinyl chloride-type compositions of the present invention are comprised of homopolymers, copolymers or blends which are made from one or more vinyl chloride-type monomers including at least one chlorinated vinyl component monomer. Vinyl chloride-type monomers as used herein broadly include monomers containing vinyl, vinylene, or vinylidene groupings of atoms, and their substituted analogs. Such polyvinyl chloride-type compositions include, for example, polyvinyl chloride and chlorinated polyvinyl chloride compositions of various degrees of chlorination, specifically including so-called intermediate chlorine resins (greater than 48 percent, but less than 67 percent chlorine) and chlorinated polyvinyl chloride, "CPVC," (containing at least 67 percent chlorine and up to about 74 percent chlorine).

Further, polyvinyl chloride-type compositions include polyvinylidene chloride and blends of polyvinylidene chloride with other polyvinyl chloride-type compositions. Vinyl component monomers which may be used with a chlorinated vinyl component monomer to form copolymers or blends are known in the art and include vinyl aliphatic esters containing from 3 to about 18 carbon atoms; esters of acrylic acid wherein the ester portion has from 1 to 12 carbon atoms, for example, methyl acrylate, ethyl acrylate, butyl acrylate, octyl acrylate, cyanoethyl acrylate, and the like; vinyl acetate; esters of methacrylic acid wherein the ester portion has from 1 to 12 carbon atoms, such as methyl methacrylate, ethyl methacrylate, butyl methacrylate, and the like; styrene and styrene derivatives having a total of from 8 to 15 carbon atoms such as alpha-methylstyrene, vinyl toluene, chlorostyrene; vinyl naphthalene; diolefins having a total of from 4 to 8 carbon atoms such as butadiene, isoprene, and including halogenated diolefins such as chloroprene; monoolefins having from 2 to 10 carbon atoms and preferably 2 to 4 carbon atoms and the like; and mixtures of any of the above types of monomers and other monomers copolymerizable therewith known to the art and to the literature.

The vinyl chloride polymer compositions of this invention also include copolymers or blends of polyvinyl chloride and chlorinated polyvinyl chloride with halogenated polymers comprising chlorosulfonated polyethylene, chlorinated polyethylene and polyepichlorohydrin, and graft copolymers or blends of polyvinyl chloride and chlorinated polyvinyl chloride with polyester, polyurethane, and polyethylene oxide polymers. An amount of vinyl chloride-type monomer is utilized to produce a copolymer containing from about 70 to about 100 percent by weight, and preferably from about 80 to about 93 percent by weight of vinyl chloride type monomer repeating units therein. By about 100 percent it is meant that some small amount of less than 1 percent of comonomer is used. The remainder of the copolymer or blend is made up of one or more above-noted repeating units from the vinyl component monomers, for example, vinyl acetate or methyl methacrylate, or one or more of the above-noted halogenated polymers or polyester, polyurethane, or polyethylene oxide polymers. Thus, an amount of vinyl component monomer, when utilized to produce a copolymer, is from about 0 to about 30 percent and preferably from about 7 to about 20 percent by weight of vinyl component repeating units therein. As used herein "from about 0" means some amount more than 0, which amount more is not specified. Polyvinyl chloride or chlorinated polyvinyl chloride wherein the chlorine level is between about 48 percent to about 74 percent once prepared, may be blended with halogenated polymers, comprising chlorosulfonated polyethylene, chlorinated polyethylene and polyepichlorohydrin; or further may be blended with polyester, polyurethane, and polyethylene oxide polymers wherein the blended polymer is present at from about 0 to about 30 percent and preferably from about 7 to about 20 percent by weight. Preferred polyvinyl chloride compositions are blends based on polyvinyl chloride and chlorinated polyvinyl chloride.

The molecular weight of a vinyl chloride polymer composition may be related to its inherent viscosity which is determined herein by dissolving 0.24 gram of the polymer composition in 50 ml of cyclohexane while mildly heating and agitating according to ASTM procedure D-1243 (1966). The vinyl chloride polymer composition starting material useful in this invention has a molecular weight such that it possesses an I.V. (inherent viscosity) in the range of from about 0.2 to about 1.6 and preferably from about 0.4 to about 1.1.

Other additives which can be utilized include, but are not limited to, fillers and/or extenders, lubricants, antioxidants, antiozonates, fungicides, bactericides, plasticizers and additional pigments such as ultramarine blue, carbon black, or black pigment.

It is noted that barium sulfate also has some effect as a whitener and/or opacifier extender as defined herein. However, this filler is relatively inert and requires large amounts of barium sulfate as a substitute for the titanium dioxide, i.e., 8 parts per 2 parts titanium dioxide by weight. Such high amounts may lead to degradation of the physical properties of the base composition as well as an unsatisfactory increase in specific gravity.

The polyvinyl chloride compositions of the present invention may be processed using conventional mixing and forming equipment used for making polyvinyl chloride compounds. Specifically, a masterbatch comprising the polymer and the additives including the whitener/opacifier package, may be mixed in appropriate compounding equipment which might be closed, such as a Brabender, Banbury, or Henschel mixer; or open, such as a rolling mill. The resulting powder mix may be used or pelletized for use in further forming equipment. Such equipment includes, for example, single or twin screw extruders, calendering, or injection or blow molding equipment.

EXAMPLES

The metal titanate compositions (pigments) used in the examples and Tables I and II are described below:

Barium Titanate-1

X-ray diffraction showed the off-white calcined material consisted of tetragonal $BaTiO_3$. Scanning electron microscopy revealed irregularly shaped, platy particles with smooth surfaces. The particles had equivalent spherical diameters less than about 3 $\mu m$, and an average particle size of 1-2$\mu m$. The BET ($N_2$) surface area was determined to be 2.6 $m^2/g$ with a total pore volume of 0.0086 cc/g and an average pore diameter of 121 Å.

Barium Titanate-2

X-ray diffraction showed the off-white calcined material consisted of tetragonal $BaTiO_3$. Scanning electron microscopy revealed particle shape and texture characteristics similar to those of barium titanate-1. The average particles were less than 2 $\mu m$ in diameter, and the average particle size was about 1 $\mu m$. The BET surface area was determined to be 1.2 $m^2/g$.

Barium Titanate-3

X-ray diffraction showed the off-white calcined material consisted of tetragonal $BaTiO_3$. Scanning electron microscopy revealed particle shape and texture characteristics similar to those of barium titanate-2. The average particle size was less than 1 $\mu m$, and the largest particles were on the order of 2 $\mu m$ in diameter. The BET surface area was determined to be 3.1 $m^2/g$.

Barium Titanate-4

X-ray diffraction showed the off-white calcined material consisted of tetragonal $BaTiO_3$. Scanning electron microscopy revealed particle shape, size, and texture characteristics similar to those of barium titanate-1. The BET surface area was determined to be 2.8 $m^2/g$.

Magnesium Titanate

X-ray diffraction showed the white crystalline powder consisted of hexagonal $MgTiO_3$ (ilmenite type structure), with trace quantities of orthorhombic $MgTi_2O_5$ and the tetragonal anatase form of $TiO_2$. Scanning electron microscopy revealed that the particles were in the form of smooth blocky pieces of irregular shape. The BET surface area was determined to be 2.71 $m^2/g$ with TPV=0.0071 cc/g and average particle diameter=105 Å.

Calcium Titanate

X-ray diffraction showed the crystalline off-white powder consisted of orthorhombic $CaTiO_3$ (distorted perovskite structure), with a very small trace of the tetragonal rutile form of $TiO_2$. Scanning electron microscopy revealed the material was in the form of loosely agglomerated clusters with average diameters up to about 10 $\mu m$. The individual particles had an average particle size of 1-2 $\mu m$ with the largest individual particles being less than about 4 $\mu m$. The BET surface area was determined to be 3.98 $m^2/g$ with TPV=0.0099 cc/g and average pore diameter=99 Å.

Lanthanum Rare Earth Titanate

The light green lanthanum rare earth titanate RE(La) titanate, was prepared from a mixture of lanthanide oxides with $La_2O_3$ being the major oxide component.

Expressed in terms of oxide concentrations, the RE(La) titanate consists of about 42.0 percent $La_2O_3$, 15.2 percent $Nd_2O_3$, and 5.1 percent $Pr_6O_{11}$. X-ray diffraction showed the presence of two crystalline phases; a major monoclinic $La_2Ti_2O_7$ type phase and a minor orthorhombic $La_4Ti_9O_{24}$ phase. In each case some of the lanthanum in the ideal formulas is replaced by both Nd and Pr. Scanning electron microscopy revealed the RE(La) titanate particles were made up of smaller, globular particles, fused into short chains with smooth rounded surfaces. The average chain length was on the order of 3 μm, and all of the chains appeared to be no longer than about 4-5 μm. The BET surface area was determined to be 1.12 $m^2/g$ with TPV=0.0031 and average pore diameter=111 Å.

Neodymium Titanate

X-ray diffraction showed the light blue crystalline powder consisted of a major $Nd_2Ti_2O_7$ monoclinic phase and a minor $Nd_4Ti_9O_{24}$ phase. Scanning electron microscopy revealed the small particles, with an average size of about 2 μm were fused into large aggregates of particles, some of which had equivalent spherical diameters as large as 20 μm. All of the surfaces of the agglomerated particles were smooth with rounded edges. The BET surface area was determined to be 1.43 $m^2/g$ with TPV=0.0029 cc/g and average particle diameter=82 Å.

Aluminum Titanate

X-ray diffraction showed the calcined white crystalline powder consisted of three major crystalline phases; orthorhombic $Al_2TiO_5$, $\beta$-$Al_2O_3$, and the tetragonal rutile form of $TiO_2$. Scanning electron microscopy revealed the presence of irregularly shaped platy particles with smooth surfaces. The BET surface area was determined to be 1.21 $m^2/g$ with TPV=0.0042 cc/g and average particle diameter=139 Å.

Bismuth Titanate

X-ray diffraction showed the off-white crystalline powder consisted of a major orthorhombic $Bi_4Ti_3O_{12}$ phase and a trace of a $Bi_2Ti_4O_{11}$ phase. Scanning electron microscopy revealed the presence of small particles, about 1 μm in diameter, that existed as a collection of individual particles of loosely aggregated groups of particles with the largest aggregates being on the order of 3 μm in diameter. The particles had smooth surfaces and rounded edges. The BET surface area was determined to be 1.52 $m^2/g$. With TPV=0.0035 cc/g and average particle diameter=93 Å.

EXAMPLE 1

This example presents the preparation of the control PVC compound containing 10 parts per hundred parts resin (phr) $TiO_2$ as an opacifying and whitening agent, with the batch size based on 100 pounds of PVC resin.

In a high speed powder mixer were blended 100 parts PVC resin (inherent viscosity=0.9), 5 phr polymeric processing aid, 2 phr epoxidized soybean oil, 1 phr tin stabilizer, 3.2 phr external lubricants, and 10 phr titanium dioxide (Du Pont TiPure R-100). The powder blend was processed and sheeted out for five minutes on a set of two-roll mills heated to 176° C. Sheets (15.24 cm × 15.24 cm × 0.0762 cm) were pressed for two minutes in a press at 182° C. The resulting product was examined for color using an ACS 1400 Spectrophotometer, CIE Lab test procedures and color differentiating formula. The reported results were calculated averages of five readings. DE* and Yellowness Index (Y.I.) values were found to be especially useful optical parameters for characterizing the appearance of the test PVC compounds, as well as the whitening ability of the extender. The DE* value is a qualitative measurement of the total color difference between a color standard and a sample. This difference includes the lightness and chromaticity differences. The lower the DE* value, the closer the color appears to the color of the standard white plaque (DE*=1.00) of the ACS 1400 Spectrophotometer. The Y.I. value is a calculated value that represents the intensity of the reflectance in the yellow region of the visible spectrum. Yellowing generally is a sign of aging and decomposition of PVC materials. Therefore, a low value of Y.I. is desirable. Light transmittance was determined by measuring the actual transmitted light in foot candles and dividing the value by 8,000 (the average intensity of direct sunlight in foot candles at noon, in summer, at 45 degrees from the horizon for locales between 30 and 40 degrees latitude north). Light transmittance is a measure of the ability of the extender to act as an opacifier. The DE*, Y.I. and light transmittance values for the control PVC compound of this example are shown in Tables I and II.

EXAMPLE 2

The procedure of Example 1 was repeated except that 8 phr $TiO_2$ and 2 phr of barium titanate-1 were used with the batch size based on 1.66 pounds of PVC resin.

EXAMPLE 3

The procedure of Example 2 was repeated except that 8 phr $TiO_2$ and 2 phr barium titanate-2, were used.

EXAMPLE 4

The procedure of Example 2 was repeated except that 8 phr $TiO_2$ and 2 phr barium titanate-3 were used.

EXAMPLE 5

The procedure of Example 2 was repeated except that 8 phr $TiO_2$ and 2 phr barium titanate-4, were used.

EXAMPLE 6

The procedure of Example 2 was repeated except that 8 phr $TiO_2$ and 2 phr magnesium titanate were used.

EXAMPLE 7

The procedure of Example 2 was repeated except that 8 phr $TiO_2$ and 2 phr calcium titanate were used.

EXAMPLE 8

The procedure of Example 2 was repeated except that 8 phr $TiO_2$ and 2 phr lanthanum rare earth titanate were used.

EXAMPLE 9

The procedure of Example 2 was repeated except that 8 phr $TiO_2$ and 2 phr neodymium titanate were used.

EXAMPLE 10

The procedure of Example 2 was repeated except that 8 phr $TiO_2$ and 2 phr aluminum titanate were used.

EXAMPLE 11

The procedure of Example 2 was repeated except that 8 phr $TiO_2$ and 2 phr bismuth titanate were used.

The optical properties of the foregoing examples are set forth in Tables I and II.

TABLE I

BARIUM TITANATE EXTENDER PIGMENTS IN A CONTROL POLYVINYL CHLORIDE COMPOSITION

| Example | Extender | Level (phr) | $TiO_2^a$ (phr) | $DE^{*b}$ | $Y.I.^c$ | % Light Transmission$^d$ |
|---|---|---|---|---|---|---|
| 1 | — | — | 10 | 2.54 | 5.99 | 0.74 |
| 2 | $BaTiO_3-1$ | 2 | 8 | 1.25 | 5.53 | 0.11 |
| 3 | $BaTiO_3-2$ | 2 | 8 | 2.44 | 6.62 | 0.24 |
| 4 | $BaTiO_3-3$ | 2 | 8 | 2.01 | 6.09 | 0.59 |
| 5 | $BaTiO_3-4$ | 2 | 8 | 2.49 | 6.78 | 0.77 |

$^a$Du Pont TiPure R-100
$^b$Measure of the overall appearance
$^c$Yellowness Index - a measure of yellowness
$^d$A measure of opacity - the smaller the values, the greater the opacity
Both DI* and Y.I. are spectrophotometrically derived, and lower values are desirable.

TABLE II

Metal Titanate Extender Pigments in a Control Polyvinyl Chloride Composition

| Example | Extender | Level (phr) | $TiO_2$ (phr) | $DE^*$ | Y.I. | % Light Transmission |
|---|---|---|---|---|---|---|
| 1 | — | — | 10 | 2.54 | 5.99 | 0.74 |
| 6 | Magnesium Titanate | 2 | 8 | 0.80 | 4.83 | 0.39 |
| 7 | Calcium Titanate | 2 | 8 | 2.02 | 4.18 | 0.043 |
| 8 | Lanthanum/ Rare Earth Titanate | 2 | 8 | 0.60 | 3.80 | 0.37 |
| 9 | Neodymium Titanate | 2 | 8 | 1.73 | 1.43 | 0.44 |
| 10 | Aluminum Titanate | 2 | 8 | 1.04 | 4.99 | 0.30 |
| 11 | Bismuth Titanate | 2 | 8 | 3.88 | 8.15 | 1.48 |

The data in Table I show that the barium titanate pigments are very effective extender pigments for $TiO_2$ in PVC. Each pigment, when substituted for 20 percent of the $TiO_2$ in the control PVC compound, functioned as an effective opacifying agent, and either lowered or essentially maintained the percent light transmission value of the control PVC compound. Although all four of the barium titanate pigments resulted in improved (lower) values of $DE^*$, only $BaTiO_3$-1 resulted in a lowered (improved) Y.I. value, and thereby functioned as both a whitening and an opacifying extender pigment for $TiO_2$ in PVC.

Table II demonstrates the ability of certain metal titanates to function as whitening and opacifying extender pigments when substituted for 20 percent of the $TiO_2$ in the control PVC compound. Magnesium titanate, calcium titanate, aluminum titanate, neodymium titanate and the lanthanum rare earth titanate functioned as both whitening and opacifying extender pigments, and resulted in PVC compounds with improved (lowered) values of $DE^*$, Y.I., and percent light transmission relative to those of the PVC control compound. The only post-transition metal titanate in Table II (bismuth titanate) did not function as either a whitening or opacifying extender pigment. When substituted for 20 percent of the $TiO_2$ in the PVC control compound, it resulted in a Y.I. value 36 percent greater than that of the control compound and a percent light transmission value 100 percent greater than that of the control compound.

The two alkaline earth titanates, $MgTiO_3$ and $CaTiO_3$, performed well as whitening and opacifying extender pigments for $TiO_2$ in PVC compounds (see Table II). They gave lower values (relative to the control) of $DE^*$, Y.I., and percent light transmission, and in combination with the reduced (8 phr) level of $TiO_2$ formed a very effective whitening and opacifying composition. position. In contrast, while all four of the $BaTiO_3$ extender pigments listed in Table I lowered or essentially maintained the $DE^*$ and percent light transmission values, two of them ($BaTiO_3$-2 and $BaTiO_3$-3) gave very unsatisfactory Y.I. values, more than 10 percent larger than Y.I. of the control polyvinyl chloride composition.

The high Y.I. values obtained for $BaTiO_3$-3 and $BaTiO_3$-4 pigments can be understood in terms of their ability to provide free BaO during processing. This free, strong base acts as a catalyst to promote dehydrochlorination of the PVC resin, resulting in discoloration (yellowing) of the processed compound. The tendency of any alkaline earth titanate to provide free basic alkaline earth oxides, BaO in the case of $BaTiO_3$, e.g., and unsatisfactory Y.I. values can be characterized with two parameters. One parameter is the $M(II)O/TiO_2$ ratio, wherein M(II) represents any divalent alkaline earth metal, e.g., magnesium, calcium, or barium. The other parameter is the percent of alkaline earth metal oxide, that is soluble in acetic acid, a measure of readily available strong base. The acetic acid soluble alkaline earth oxide is determined by the following analytical procedure:

1. Add a 1 g sample of the alkaline earth metal titanate to 50 ml of 2.8 normal acetic acid.
2. Agitate the slurry for ten minutes.
3. Filter the slurry to recover the solution free of unreacted metal titanate.
4. Determine the concentration of alkaline earth metal ions in solution by means of atomic absorption spectroscopy. The values of these two parameters for the six alkaline earth oxides of Examples 2-7 are listed below:

| Alkaline Earth Titanate | $M(II)O/TiO_2$ Molar Ratio | % Soluble in Acetic Acid |
|---|---|---|
| $BaTiO_3-1$ | 0.976 | 0.81 |
| $BaTiO_3-2$ | 0.997 | 1.3 |
| $BaTiO_3-3$ | 0.992 | ND* |
| $BaTiO_3-4$ | 1.007 | 2.6 |
| $MgTiO_3$ | 0.983 | 0.26 |
| $CaTiO_3$ | 0.978 | 0.43 |

*Not determined

The significance of this is that the Y.I. values from Tables I and II can be correlated with the $M(II)O/TiO_2$ and acetic acid solubility parameters. The three alkaline earth titanates ($BaTiO_3$-1, $MgTiO_3$, and $CaTiO_3$) that resulted in PVC compounds with Y.I. values less than Y.I. of the control compound each had $M(II)O/TiO_2$ values significantly less than one, and low solubilities in acetic acid, significantly less than 1 percent. For $BaTiO_3$-2 and $BaTiO_3$-4, with $M(II)O/TiO_2$ values essentially equal to one, the solubility of BaO in acetic acid was much larger than 1 percent. The solubility of BaO from $BaTiO_3$-3 in acetic acid was not determined.

The conclusion resulting from the above discussion is very clear. In order for an alkaline earth titanate, in combination with TiO$_2$, to give an effective whitening and opacifying composition for polyvinyl chloride compositions, the M(II)O/TiO$_2$ molar ratio must be less than 1.0, preferably less than 0.99, and with a solubility in 2.8 normal acetic acid of less than 1 percent, preferably less than 0.82 percent. Alkaline earth titanates with a molar ratio of M(II)O/TiO$_2 \geq 1.0$ and solubilities in 2.8 normal acetic acid $> 1$ percent when combined with TiO$_2$ will give useful opacifying compositions for polyvinyl chloride compositions, but will not function as whitening compositions.

While in accordance with the Patent Statutes, the best mode and preferred embodiment has been set forth, the scope of the invention is not limited thereto, but rather by the scope of the attached claims.

What is claimed is:

1. A polymeric composition comprising a polymer based on a homopolymer or copolymer prepared from one or more of vinyl chloride and vinylidene chloride, and
    a whitening opacifying package comprising from about 4 to about 30 parts titanium dioxide per 100 parts polymer, and from about 2 to about 10 parts per 100 parts of polymer of an extender consisting of one or more of magnesium titanate, calcium titanate, barium titanate and aluminum titanate, wherein said whitening opacifying package comprises at least about 70 percent titanium dioxide.

2. A polymer based on a homopolymer or copolymer prepared from one or more of vinyl chloride and vinylidene chloride, and
    a whitening opacifying package comprising from about 4 to about 30 parts titanium dioxide per 100 parts polymer, and from about 2 to about 10 parts per 100 parts of polymer of an extender consisting of one or more of magnesium titanate, calcium titanate, barium titanate and aluminum titanate, wherein said whitening opacifying package comprises at least about 70 percent titanium dioxide.

3. A polymeric composition comprising a polymer based on a homopolymer or copolymer prepared from one or more of vinyl chloride and vinylidene chloride, and
    a whitening opacifying package comprising from about 4 to about 30 parts titanium dioxide per 100 parts polymer, and from about 2 to about 10 parts per 100 parts of polymer of an extender comprising one or more lanthanide titanate, wherein said whitening opacifying package comprises at least about 70 percent titanium dioxide.

4. A polymeric composition as set forth in claim 1, wherein said polymer comprises polyvinyl chloride, polyvinylidene chloride, chlorinated polyvinyl chloride or said polymeric composition comprises a blend of said polymer and one or more of the group consisting of a polymer prepared from a vinyl component monomer, a halogenated polymer, a polyester, a polyurethane, and a polyethylene oxide polymer.

5. A composition as set forth in claim 1, wherein said extender comprises barium titanate.

6. A composition as set forth in claim 1, wherein said extender replaces up to about 20 percent by weight of the total quantity of titanium dioxide whitening and opacifying agent in a whitened vinyl chloride composition.

7. A composition as set forth in claim 6, wherein said whitening and opacifying package comprises from about 5 to about 15 percent by weight of titanium dioxide and more than 2 up to about 5 phr of said metal titanate.

8. A composition as set forth in claim 7, wherein said whitening and opacifying package comprises from about 4 to about 10 phr by weight of titanium dioxide and more than 2 up to about 3 phr of said metal titanate.

9. A composition as set forth in claim 1 wherein said extender is selected from the group comprising magnesium titanate, calcium titanate, and barium titanate.

10. A polymeric composition as set forth in claim 1, wherein said extender comprises one or more of magnesium titanate, calcium titanate, or barium titanate.

11. A polymeric composition as set forth in claim 10, wherein said whitening and opacifying package comprises from about 4 to about 15 phr by weight of titanium dioxide and more than 2 up to about 5 phr of said metal titanate.

12. A polymeric composition as set forth in claim 11, wherein said whitening and opacifying package comprises from about 4 to about 10 phr by weight of titanium dioxide and more than 2 up to about 3 phr of said metal titanate.

* * * * *